(No Model.)
J. J. BYRNE.
ADJUSTING MECHANISM FOR CALIPERS.
No. 279,534. Patented June 19, 1883.
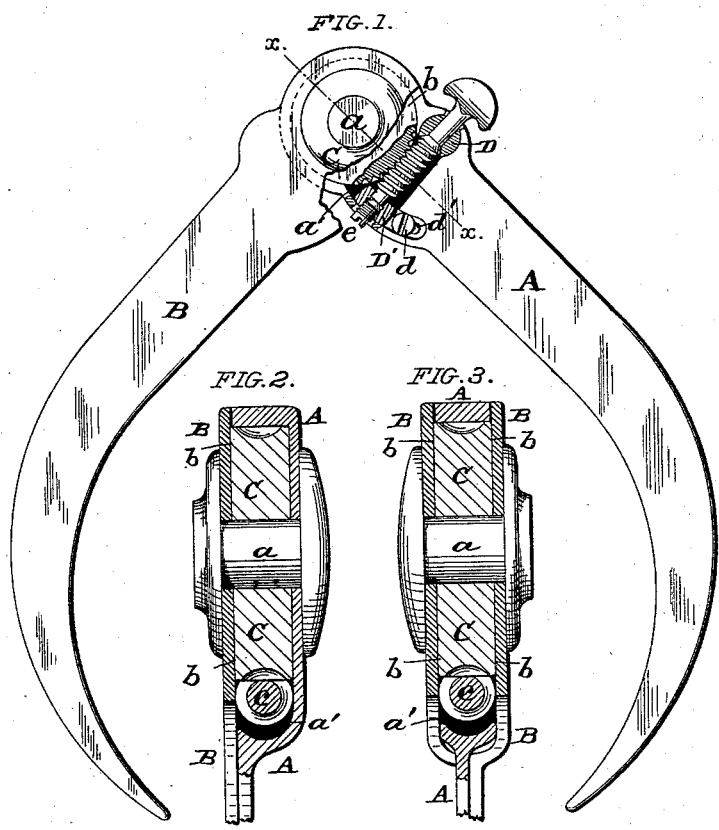
ATTEST:
C. W. Bechler.
A. W. Hoig.
INVENTOR:
John J. Byrne
per Robert Burns
attorney.

UNITED STATES PATENT OFFICE.

JOHN J. BYRNE, OF CHICAGO, ILLINOIS.

ADJUSTING MECHANISM FOR CALIPERS.

SPECIFICATION forming part of Letters Patent No. 279,534, dated June 19, 1883.

Application filed February 12, 1883. (No model.)

*To all whom it may concern:*

Be it known that I, JOHN J. BYRNE, a citizen of the United States, residing at Chicago, in the county of Cook and State of Illinois, have invented a certain new and useful Improvement in Adjusting Mechanism for Mechanics' Tools; and I do hereby declare that the following is a full, clear, and exact description thereof, which will enable others skilled in the art to make and use the same, reference being had to the accompanying drawings, forming a part of this specification.

This invention has for its object, first, the adjustment in a rapid and accurate manner of the adjustable measuring or indicating portions of mechanics' tools—such as calipers, dividers, surface-gages, bevel-squares, &c.; second, in an improved construction by which wear of the adjusting mechanism can be readily and effectively taken up; and my invention consists, first, in the provision, in connection with such tools, of a worm-wheel and endless screw or worm for effecting an accurate adjustment of the parts, the arrangement being such that the operating-screw is attached to one member of such tools, and the other member is attached to the worm-wheel by friction, all as will hereinafter more fully appear; second, in certain details of construction whereby the "lost motion" caused by the wear of parts in use can be readily taken up, as will hereinafter more fully appear.

In the drawings, Figure 1 is a front view, with parts broken away, illustrating my improvement applied to a pair of calipers. Figs. 2 and 3 are enlarged detail cross-sections of the same.

Referring to the drawings, A and B represent the two members of the tool, adjustable around a center or pivot, *a*, as usual.

In a recess, *a'*, between the members A B, and concentric with the pivot *a*, is a worm wheel or disk, C, meshing with and driven by an endless screw, *c*, journaled to the member A. The other member, B, is attached or joined by friction to the face *b* of the worm wheel or disk C, so as to move with the same when turned by the endless screw *c*, and yet permit of an adjustment independent of such screw adjustment when desired. By this means the parts can be quickly adjusted by hand to an approximate of the measurement or indication required, and the exact measurement or indication then attained by means of the endless screw *c*.

By arranging the operating parts within the recess *a'* such parts are protected from damage in a very perfect manner.

In order to take up lost motion of the parts, caused by wear in use, I journal one end of the endless screw *c* in a turning head or bearing, D, and the other end in a head or bearing, D', capable of adjustment toward the worm-wheel C, as indicated in Fig. 1, and said head is locked to its adjustment by means of a screw or bolt, *d*, passing through a slotted extension of the head D', the slot *d'* being of an elongated form to permit of the adjusting movement above mentioned taking place. Lost motion endwise of the endless screw *c* is taken up by means of a center journal-screw, *e*, having bearing in the head D', as shown in Fig. 1.

While in the drawings I have shown my invention applied to a pair of calipers, the construction is applicable to the usual adjustable mechanics' tools—such as surface-gages, adjustable bevels, &c.—the adjusting mechanism remaining the same, while the detail form of the two members A B is made to conform to the shape of the tool to which my improvement is applied.

I am aware that prior to my invention calipers have had their legs adjusted by means of an endless screw and worm-wheel; but as so constructed no movement of the legs independent of the screw adjustment was permissible, and which independent adjustment is an essential feature of my invention. I therefore do not claim, broadly, an endless screw and worm-wheel adjustment for mechanics' tools; but What I do claim as my invention, and desire to secure by Letters Patent, is—

1. In an adjusting mechanism for mechanics' tools, the combination of the member B, secured to and moving with the worm-wheel C by friction contact, and the member A, provided with journals for the endless operating-screw *c*, as described, and for the purpose set forth.

2. In an adjusting mechanism for mechanics' tools, as herein described, the combination of the turning head D, adjustable head D′, endless screw c, and worm-wheel C, as described, and for the purpose set forth.

3. In an adjusting device for mechanics' tools, as herein described, the combination of the turning head D, adjustable head D′, journal-screw e, endless screw c, and worm-wheel C, as described, and for the purpose set forth.

In testimony whereof witness my hand this 8th day of July, 1882, at Chicago, Cook county, Illinois.

JNO. J. BYRNE.

In presence of—
  JAMES H. COYNE,
  CHAS. H. SCHOFF.